Dec. 19, 1933.  H. C. PIERCE  1,940,269
AUTOMATICALLY CONTROLLED ARTICLE COATING APPARATUS
Filed Jan. 2, 1932  2 Sheets-Sheet 1
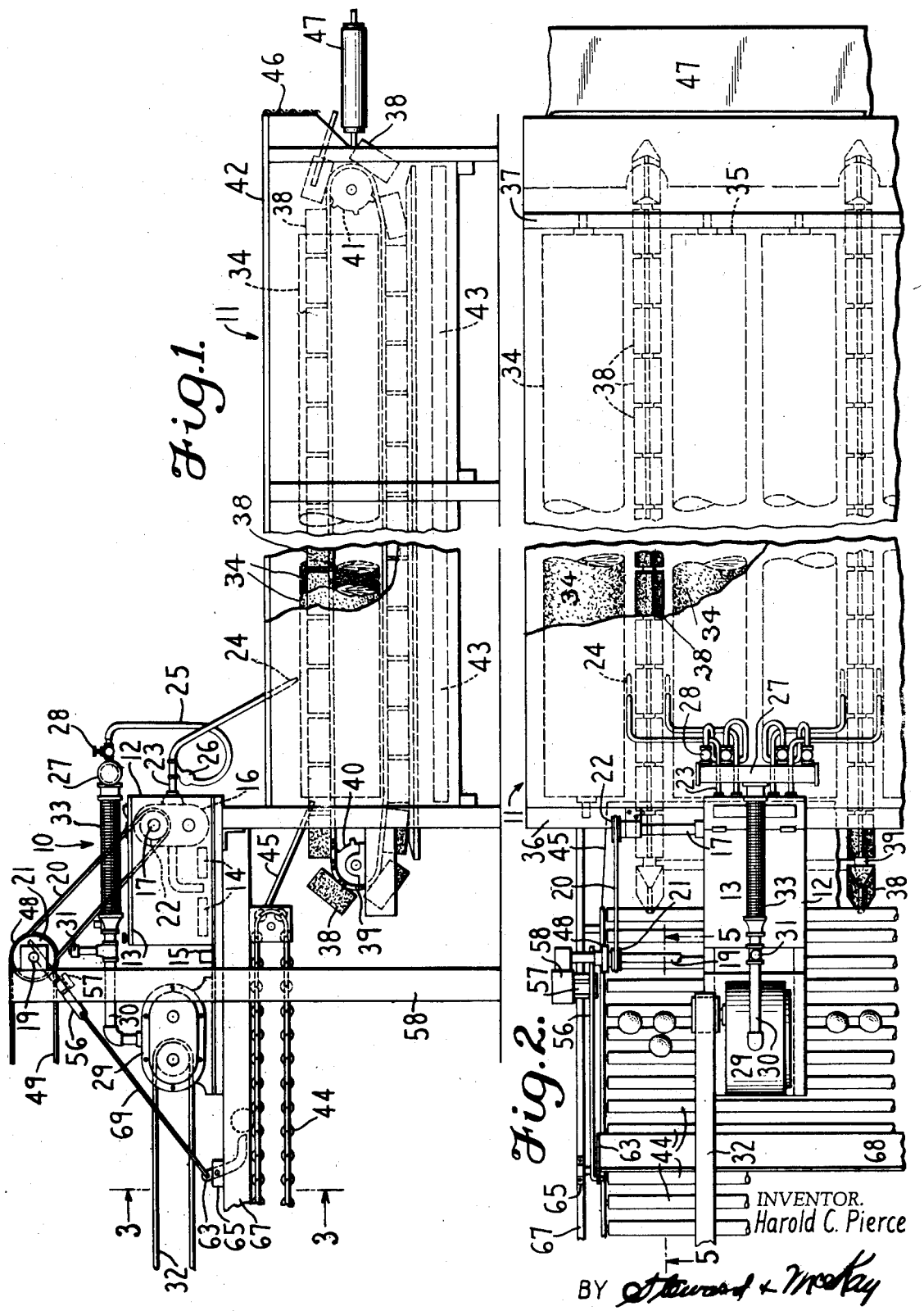
INVENTOR.
Harold C. Pierce
BY Steward & McKay
his ATTORNEYS Dec. 19, 1933.  H. C. PIERCE  1,940,269
AUTOMATICALLY CONTROLLED ARTICLE COATING APPARATUS
Filed Jan. 2, 1932  2 Sheets-Sheet 2
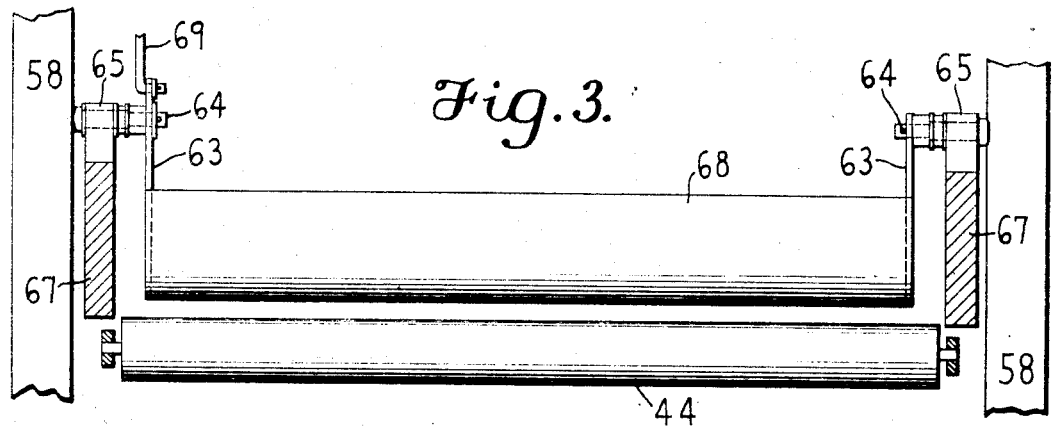
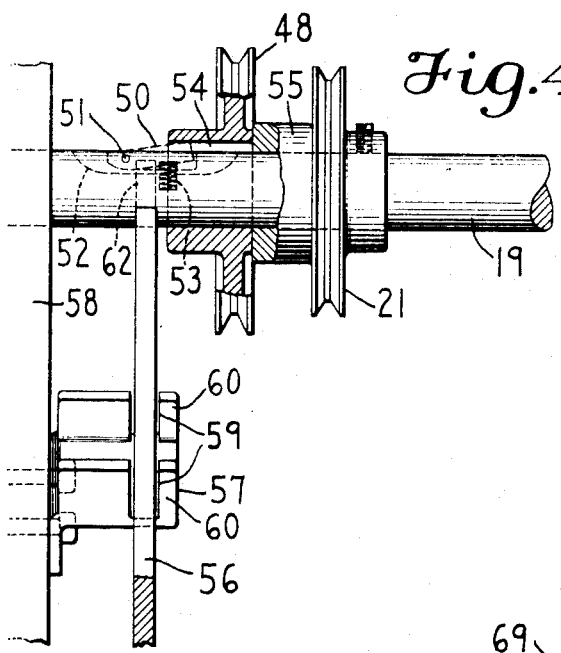
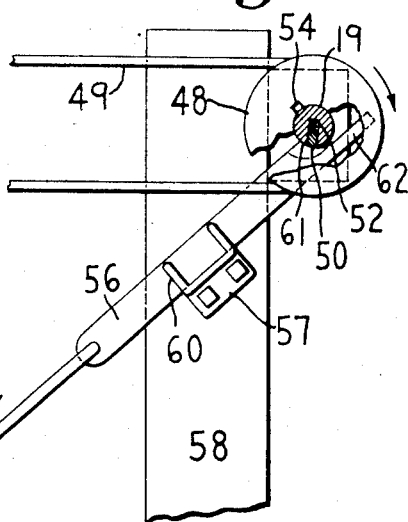
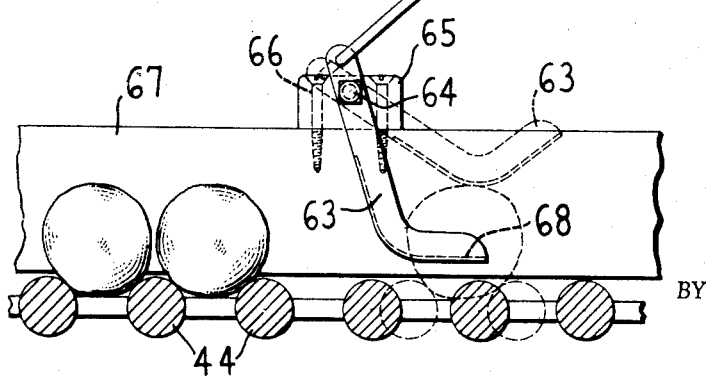
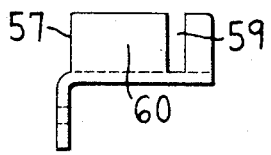
INVENTOR.
Harold C. Pierce
BY
his ATTORNEYS.

Patented Dec. 19, 1933

1,940,269

UNITED STATES PATENT OFFICE 1,940,269

AUTOMATICALLY CONTROLLED ARTICLE COATING APPARATUS

Harold C. Pierce, Anaheim, Calif., assignor to Brogdex Company, Winter Haven, Fla., a corporation of Florida Application January 2, 1932. Serial No. 584,532

9 Claims. (Cl. 91—44)

My invention relates to automatically controlled article coating apparatus and more particularly to such apparatus for coating fruit with a protective and preservative material.

Certain types of article coating apparatus employ a power-driven mechanism to effect a positive feed of more or less fluent coating material to the spray nozzles or other devices effective in applying the material to the articles fed to the apparatus. One disadvantage in the use of such apparatus has been the continuance of such feed of the coating material and the consequent projection of that material from the spray nozzles or the like despite the cessation in the feed of the articles to the apparatus which may occur over more or less prolonged periods of time in the day's operations; for, due to negligence of the operator which is apt to occur, the customary manually operable means for disconnecting the power drive from the feeding mechanism for the coating material cannot be relied upon as a safeguard against such continued feed. Also when the feeding mechanism for the coating material has been disconnected from its power drive, the manually-operated connection is often not again made with sufficient promptness upon renewal of the feed of the articles to the apparatus to properly coat the first articles of the new run.

Accordingly, a general object of the present invention is the correction of those defects in the general type of apparatus referred to by the provision of control mechanism automatically operating upon cessation and renewal of feed of the articles to the apparatus to respectively disengage and engage the feeding mechanism for the coating material with its power drive.

A more particular object of my invention is the provision of control mechanism for fruit coating apparatus automatically operating upon cessation and renewal of feed of the fruit to the apparatus to stop and renew, respectively, the delivery of the coating material to the air brush or other device of the apparatus designed to apply the material to the fruit.

While not limited to such field of use, the control mechanism of my invention is especially adapted for apparatus designed to coat fresh citrus and other fruits, such as oranges, grapefruit, tangerines, lemons, apples and the like, with a preservative coating of waxy or other suitable material in a manner to maintain the fruit in fresh, plump condition, to protect it against infection by mold or rot organisms and to improve its general appearance.

In one mode of such fruit treatment now extensively practiced in the preparation of citrus fruits for market, a normally solid protective and preservative material, generally paraffin either alone or mixed with an oily vehicle or solvent, is applied to the fruit in the form of a fine spray, more particularly in the form of a mist or fog produced by atomizing or nebulizing the material in liquid form, the mist or fog, when it contacts with the fruit, depositing thereon exceedingly fine particles of the material to form a thin coating, the fruit then being advantageously subjected to a rubbing or brushing action to spread this coating uniformly over its surface in the form of an exceedingly thin film.

A form of apparatus now extensively used and found particularly effective in such fruit treatment comprises a mechanically-driven fruit-rubbing or brushing unit to which the fruit is fed and through which unit it travels during the rubbing or brushing operation thereon and an atomizing device by which the coating material in fluent condition is atomized or nebulized by air or similar fluid under pressure and projected in the form of a fine mist or fog into contact with the fruit traversing the brushing unit. Means are employed for maintaining a supply body of the paraffin or like coating material in liquid form or at least in such fluent condition as to be nebulized effectively, and means for positively feeding that coating material in fluent condition from the supply to the atomizing device. Generally one or more power driven pumps, with means to adjustably vary the quantity of coating material delivered, constitute the means for positively feeding the fluent coating material from the supply to the atomizer.

In the customary packing house equipment employing such an apparatus as described above, that apparatus is in series with fruit elevator and conveyor units, grading and sizing belts, and the like, all running in timed relation for the general advance of the fruit in large quantities through the various stages of operations terminating in the boxing of the fruit for shipment. The customary practice, therefore, is to continue the entire series of apparatus units in operation despite temporary cessations in the initial feed of the fruit thereto, and it has been found undesirable to stop the running of the coating apparatus as a whole upon the interruptions which occur over more or less extended periods during the day's operations in the feed of the fruit to that particular apparatus unit of the series. Unless, therefore, the spray of the coating material is stopped promptly upon cessation of feed of the fruit to the coating apparatus there is a waste of that material as well as a fouling of the apparatus. Another disadvantage of the continued spray has been the excessive deposits of the coating material on the empty brush rolls which were found to seriously interfere with the formation of the desired uniformly thin film coating on the fruit when its feed to the apparatus was renewed.

For reasons already given, attempts to avoid these disadvantages by providing some form of manually operable means for disengaging the feed pumps for the coating material from and re-engaging them with their power drive, have proved unavailing; and the control mechanism of my invention, while not limited to this field of use, is particularly designed to overcome these disadvantages in the operation of fruit coating apparatus of the type above referred to.

In general principle, my invention contemplates the provision, in an article coating apparatus having power driven mechanism for feeding the coating material to the spray or other applying device, of control means automatically operating incident to the feed of articles to the apparatus and to the cessation of such feed to respectively start and stop the drive of the feeding mechanism for the coating material.

As the hereinafter-described specific embodiment of my invention applied to a fruit coating apparatus of the type described above, and found in practice to substantially improve the treatment of fruit by such apparatus, is aptly illustrative of the principles and advantages of the invention, further reference will be made only to such embodiment for the more detailed disclosure of the principles of the invention. It is to be understood, however, that the specific embodiment referred to is merely illustrative of the invention, its uses and advantages, and that various changes and modifications of the embodiment shown and adaptations to other article-coating apparatus are within the scope of the invention as defined in the appended claims.

In the drawings:

Fig. 1 is a side elevational view of a fruit-treating apparatus of the type referred to embodying the invention;

Fig. 2 is a top plan view of the apparatus with certain parts of the left-hand portion of the apparatus as shown in Fig. 1 broken away;

Fig. 3 is a view on an enlarged scale of certain parts of the apparatus, taken on the section line 3—3 of Fig. 1, looking in the direction of the arrows;

Fig. 4 is a detailed view, mostly in elevation and on an enlarged scale, looking from the left toward the right in Fig. 1, of a portion of the counter shaft and the pulleys thereon for driving the pumps, and of associated devices for controlling the driving connection, the power pulley being shown partly in section;

Fig. 5 is an enlarged detailed view, taken on the section line 5—5 of Fig. 2, but with only the power pulley on the counter shaft shown, and certain parts broken away, for clearness of illustration; and Fig. 6 is an end elevational view of a guiding bracket for a shiftable rod of the clutch-control means, that bracket appearing in side elevational view in Fig. 5.

Referring to the drawings, the particular fruit coating apparatus in which the preferred form of my invention is incorporated in the illustrative example of practice of the invention comprises an atomizer or nebulizer unit indicated generally by 10 and a fruit rubbing or brushing unit indicated generally by 11.

The atomizer or nebulizer unit 10 comprises a container or receptable 12 for the paraffin or other preservative material or composition which is to be applied to the fruit. Tank or reservoir 12, which has a hinged cover 13, is provided with electric heating coils, indicated diagrammatically in dotted lines at 14, for melting the paraffin and maintaining it in molten or fluid condition, the heating coils being controlled by the switch 15.

Mounted within the container or tank 12 adjacent one end thereof, are means for positively feeding the paraffin, in fluid condition, from the supply in the tank to the atomizer and spray devices of the apparatus. In apparatus of this type the feeding means generally comprise a series of mechanical pumps, one for each atomizer and spray device, all operated from a common shaft. One such pump is shown diagrammatically in dotted lines at 16 in Fig. 1, and the common shaft for driving all the pumps is shown projecting exteriorly of the tank at 17 in Fig. 2. The pump shaft 17 may be driven from any suitable source of power and through any suitable power transmission means. In the particular apparatus here shown, the pump shaft is driven from the source of power, not shown, through a counter shaft 19 and belt 20 entrained over pulleys 21 and 22 on the counter shaft and the pump shaft, respectively. The power transmission means to the counter shaft will later be described in connection with certain departures from the heretofore known and used types of driving connection in accordance with the principles of the present invention.

Each of the atomizing devices, four in number in the particular apparatus here shown, comprises a pipe 23 for the flow of the coating material, terminal spray nozzle 24 and an airline connection 25 for supplying air under pressure to the pipe 23 to effect the atomization or nebulization of the coating material in a manner to project the same as a fine mist or fog from the nozzle. The coating material is fed to the pipes 23 by the pumps 16 in the supply tank, and a check valve 26 is provided in each compressed-air pipe 25 near its juncture with the pipe 23 to prevent the coating material from entering the air line 25.

Each air pipe 25 is connected to a manifold or header 27 by a valve 28, the manifold or header being supplied with air under pressure by a pump or blower 29 connected to the header by the piping 30 which is provided with a relief valve 31 to prevent excess air pressure. The air pump is driven from the source of power, not shown, through the belt drive 32, and the air thus supplied for atomizing the paraffin is heated by electric heater 33 inserted in the piping 30 which connects the air pump with the air manifold 27.

The fruit rubbing or brushing unit of the apparatus comprises one or more pairs of parallel spaced brush rolls 34 and 35 rotatably mounted in the cross-pieces 36 and 37 of the supporting framework of the apparatus, and an endless conveyor between the brush rolls of each pair comprising fruit advancing blocks 38 of inverted V-shape having horse-hair or the like brush faces, as do the brush rolls, and mounted on the endless chain 39 running over sprockets 40 and 41. Each brush-block conveyor is driven so that its upper fruit-advancing run travels toward the right in Figs. 1 and 2, and the cooperating brush rolls are rotated at suitable speed, by mechanism not shown. The fruit advances through the trough-shaped runways provided by the sloping sides of the conveyor brush blocks and the cylindrical surfaces of the cooperating brush rolls, which parts also support and subject the fruit to a rubbing or brushing action during that advance.

As the mist or fog of paraffin is projected from the nozzles 24 of the atomizers into each of the fruit runways, the fruit advancing therethrough is thoroughly sprayed with the paraffin in finely divided form, and the rotating brush roll surfaces and rectilinearly moving brush-block surfaces then cooperate by their rubbing or brushing action to spread out the finely divided material on the fruit into a uniform coating of the film-like character desired.

Generally the brushing unit of such a type of fruit-coating apparatus is enclosed, as shown in Fig. 1, the cover of the housing being indicated at 42; and generally also electric or other suitable heating means, diagrammatically shown at 43, are provided in the housing to maintain the paraffin deposits on the fruit sufficiently fluent to facilitate their being spread in a thin film uniformly thereover.

The fruit is fed to the coating apparatus by an endless conveyor 44 of the customary roller type, the fruit immediately reaching the runways of the rubbing or brushing unit over the inclined chute board 45. The coated fruit emerges from the apparatus under the flexible flap 46 at its discharge end on to the endless conveyor 47 by which and associated conveyor units the fruit continues its travel through the subsequent operations in the packing house of drying, grading, sizing and packing for shipment.

For reasons already given, the effectiveness of such an apparatus in coating fruit is materially reduced if the spray of the coating material is not promptly discontinued upon cessation of feed of fruit thereto and promptly renewed upon renewal of the feed of the fruit. As also hereinbefore stated, my invention, when embodied in such an apparatus in the association or combination with the parts of that apparatus as contemplated by the invention, insures such a discontinuance and renewal of the spray of the coating material.

In the illustrative embodiment of my invention in the particular fruit-coating apparatus so far described, the counter shaft 19, in the power-transmission line for driving the pumps to feed the coating material, is provided with a loose pulley 48 and a clutch mechanism for making and breaking a driving connection between that pulley and the counter shaft. The pulley is continuously driven from the source of power, not shown, by the driving belt 49, so that when the clutch is engaged the pulley 48 drives the counter shaft 19 and the latter in turn drives the pumps and when the clutch is disengaged the rotation of the counter shaft ceases and in turn the operation of the pumps. Arranged in operative relation with the clutch mechanism is a control member extending into the line of feed of fruit to the apparatus and operable out of an initial position by contact therewith of fruit being fed and automatically returning to the initial position upon cessation of such feed to control the engaging and disengaging function of the clutch mechanism.

Referring more particularly to the clutch mechanism, in the present illustrative embodiment of the invention it comprises a clutch member or key 50 pivotally mounted at 51 in a groove 52 provided in the cylindrical face of the counter shaft 19, with the groove of such depth and contour, as shown in Figs. 4 and 5, as to present the outer face of the key, when retracted, flush with the cylindrical face of the counter shaft, and to permit the pivotal movement of the key outwardly to extend its free end beyond the cylindrical face of the counter shaft. A spring 53, housed in a recess in the bottom of the groove in the shaft 19 and in an opposed recess in the bottom face of the key, tends to resiliently pivot the key outwardly of the groove in the shaft; and a groove 54 is provided in the hub of the power pulley 48 to receive the outwardly pivoted end of the key in a manner to releasably lock the pulley fast on the shaft. When, therefore, the key is pivoted outwardly under the influence of its spring into the groove in the power pulley the clutch is engaged or set for driving the counter shaft and in consequence the pumps for feeding the coating material to the atomizers of the apparatus, and the clutch may be disengaged or released by pressure on the clutch key sufficient to retract it wholly within the groove in the counter shaft.

The loose pulley 48 is spaced from the fast pulley 21 by a spacing collar 55 on the counter shaft, as shown in Fig. 4.

Referring more particularly to the means for controlling the engaging and disengaging functions of the clutch, in the present illustrative embodiment of the invention that control means comprises a clutch-operating rod or bar 56 slidably mounted at an inclination as shown in Figs. 1 and 5 in a bracket 57 secured to one of the uprights 58 of the apparatus frame below and closely adjacent the counter shaft 19, the bar being mounted for its sliding movement in the notches 59 of the two forks or arms 60 of the bracket. The upper free end portion of the clutch bar is reduced to form a concave shoulder 61 and a terminal arm 62 projecting beneath and across the counter shaft 19 in the region of the clutch key pivoted in the groove of that shaft, as shown in Figs. 4 and 5. With the clutch bar thus mounted for rectilinear movement in obliquely upward and downward directions, its terminal arm 62 is always spaced a sufficient distance below the cylindrical surface of the counter shaft 19 to permit the clutch key 50 to pivot outwardly into engagement in the groove 54 of the power pulley and consequently to enable the rotation of the counter shaft 19 in the direction indicated by the arrow on Fig. 5. But with the clutch key thus pivoted outwardly into engagement with the power pulley and with the counter shaft thus rotating, when the clutch bar is thrown to its upper position shown in full lines in Fig. 5, the shoulder 61 of that bar, because of its cam contour, smoothly contacts the clutch key to retract the same from that engagement. Upon the downward throw of the clutch bar its cam shoulder so retreats from the counter shaft as to free the clutch key for its pivotal movement, under the influence of its spring, again into the groove of the power pulley when that groove, in the continuous rotation of the pulley, comes into position for such engagement.

Thus, the clutch bar is designed when in the position of its upward throw to act positively to disengage the clutch key 50 from its groove 54 in the power pulley 48 so as to break the driving connection between the power pulley and the counter shaft 19 and when in the position of its downward throw to free that key for its outward pivoting movement under the influence of its spring again into the groove of the power pulley.

In the present instance, the means for controllably actuating the clutch bar and thereby effecting the engagement and disengagement of the clutch coincidently with the feed and the cessation of feed of fruit to the apparatus, comprises a control member extending into the path of feed of the fruit and having an initial set position from which it is movable by the advancing fruit and to which it automatically returns upon cessation of feed of the fruit, and an operating rod linking the control member to the clutch bar. The control member is therefore also an actuating member, functioning to throw the clutch bar 56. That control or actuating member comprises two side lever arms 63, pivotally mounted near their upper extremities by the bolts 64 in the brackets 65 secured by screws 66 to the side rails 67 of the conveyor 44 feeding the fruit to the apparatus. A curved base member 68 joins the correspondingly curved lower extremities of the lever arms, the base member extending the full width of the conveyor and being preferably of sheet metal such as galvanized sheet iron. The entire control member thus formed and thus pivotally mounted presents its base portion depending into such proximity to the upper run of the fruit-feeding conveyor as to be bodily lifted by pressure of the advancing fruit thereagainst so that the lever arms are swung on their pivots from the initial position they occupy when no fruit is on the conveyor as shown in full lines in Fig. 5 to the position shown in dotted lines in that view. The rod 69, pivotally linked to the upper extremity of one of the lever arms 63 of the control member and to the lower extremity of the clutch bar 56, transmits movement from the control member to the clutch bar.

When the control member is in its initial position occupied when no fruit is on the conveyor, shown in full lines in Fig. 5, it is to be noted that the upper end of the lever arm of the control member has, through the rod 69, thrown the clutch bar 56 to its upper position bringing its cam shoulder 61 into engagement with the clutch key 50 in a manner to retract that key from the groove in the power pulley 48 and thus break the driving connection between that pulley and the counter shaft 19 from which the pumps for feeding the coating material are driven. Due to the resistance offered by the pumps, the counter shaft stops abruptly upon the retraction of the clutch key from its engagement with the power pulley so that there is not that continued rotation of the shaft which would carry the key beyond the cam shoulder 61 of the clutch bar. Consequently, as long as the clutch bar is in its upper position there is no danger of a freeing of the clutch key enabling its re-engagement with the power pulley. When the control member is actuated by the fruit advancing on the feeding conveyor so that the lever arms are moved to the position shown in dotted lines in Fig. 5, the clutch bar is thrown to its lower position which retracts its cam shoulder 61 out of engagement with the clutch key 50.

Thereupon the key, under the pressure of its spring, immediately pivots outwardly into the groove in the power pulley 48, thus making the driving connection between that pulley and the counter shaft 19 so that the pumps are started for the feeding of the coating material to the atomizers of the apparatus.

Thus the described arrangement is such that as long as fruit is being fed to the coating apparatus, a driving connection is maintained between the source of power and the pumps which feed the coating material to the atomizers, and that driving connection is broken promptly upon cessation of feed of the fruit and as promptly renewed upon renewal of feed of the fruit.

If desired, the air compressor can also be driven from the same shaft as the fuel pumps, such, for example, as the counter shaft 19 in the present apparatus, so that the compressed-air feed as well as the feed of coating material to the atomizers may be automatically stopped upon cessation of feed of fruit to the apparatus. Generally, however, it is preferable, as in the described arrangement, to continue the feed of the compressed air after the feeding of the coating material has stopped upon cessation of feed of the articles to be coated, as such continued feed of air to the atomizers serves to blow out therefrom the last of the paraffin or other coating material of the preceding feed and thereby to keep the atomizers free from accumulations of solidified coating material.

What is claimed is:

1. In an article coating apparatus, the combination with means for feeding articles to the apparatus, mechanically driven means for feeding coating material to the apparatus for application to said articles and driving means therefor, of means for connecting and disconnecting said driving means with and from said driven means comprising a clutch between said driving and driven means and control mechanism therefor arranged to be mechanically actuated by the articles in their feeding movement to effect the setting of said clutch for said connection and automatically actuating to release said clutch upon cessation of feed of said articles.

2. In an article coating apparatus, the combination with means for feeding articles thereto, mechanically driven means for feeding coating material for application to said articles and a source of power therefor, of a spring-actuated clutch automatically setting to make and releasable to break a driving connection between said source of power and said mechanically driven means, and clutch-control mechanism automatically operable to release said clutch and restrain the same from setting when the feed of articles to said apparatus is stopped but arranged to be actuated by said articles being fed to said apparatus to free said clutch for its automatic setting.

3. In an article coating apparatus, the combination with means for feeding articles to the apparatus, mechanically driven means for feeding coating material to the apparatus for application to said articles and a source of power therefore, of clutch mechanism set to make and releasable to break a driving connection between said source of power and said mechanically driven means and clutch-control mechanism having a member movable to set the clutch by engagement therewith of articles being fed to the apparatus and automatically moving upon cessation of said feed to release the clutch.

4. Control mechanism for article coating apparatus of the type having means for feeding articles thereto along a predetermined path, pump means for feeding coating material for application to said articles and a driving shaft therefor, said control mechanism comprising a power pulley, clutch mechanism between said pulley and shaft having a clutch element normally spring-pressed to set position effecting a driving connection between said pulley and shaft, and clutch-control means comprising a clutch bar adapted to be thrown into engagement with said clutch element to release the same and thereby break said driving connection, and a control member automatically movable to effect said throw of said clutch bar but so arranged in the path of feed of said articles as to be restrained by the articles in their feeding movement from throwing said clutch bar.

5. Control mechanism for article coating apparatus of the type having means for advancing articles along a predetermined path into position to be coated by said apparatus, pump means for feeding coating material for application to said articles and a driving shaft therefor, said control mechanism comprising a power pulley loose on said shaft, a clutch key and spring therefor, said shaft being provided with a groove pivotally mounting said key and housing said spring in a manner to resiliently pivot said key outwardly of said shaft and the hub of said pulley being provided with a groove to receive the outwardly pivoted end of said key to effect a driving connection between said pulley and shaft, and clutch-control means comprising a clutch bar mounted for opposite directions of throw into and out of engagement with said key respectively to retract the same from its connection with said power pulley and to release said key for renewal of said connection, and a control member extending into the path of feed of articles to the apparatus and automatically movable when no articles are being fed to throw said clutch bar to its key-engaging position but movable by articles being fed to throw said clutch bar out of its key-engaging position.

6. In a fruit coating apparatus, the combination with fruit-conveyor means, a device for spraying fluent coating material on fruit delivered to said conveyor means, a pump for supplying fluent-coating material to said spray device and driving means for said pump, of clutch mechanism set to make and releasable to break a driving connection between said driving means and said pump, and clutch-control means comprising a control member extending into the path of the fruit on said conveyor means and arranged to be operated by the passing fruit to effect the setting of said clutch mechanism and automatically movable upon cessation of delivery of fruit to said conveyor means to effect the release of said clutch mechanism.

7. In an apparatus for treating fruit, the combination with mechanism for rubbing or brushing fruit, means arranged to feed fruit in a predetermined path to said mechanism, means for atomizing or nebulizing protective material into contact with said fruit fed to said rubbing or brushing mechanism, mechanically driven means for feeding said protective material in fluent form to said atomizing or nebulizing means and a source of power therefor, of clutch mechanism set to make and released to break a driving connection between said source of power and said mechanically driven means, and clutch-control mechanism having an actuating member operable by fruit fed to said apparatus to effect the setting of said clutch mechanism and automatically operating in the absence of said feed of fruit to release said clutch mechanism.

8. In a fruit treating apparatus, the combination with revoluble brush-roll mechanism, means for feeding fruit thereto, means for atomizing and spraying protective material upon fruit fed to said brush-roll mechanism, a receptacle for liquid protective material, pump means for feeding said material from said receptacle to said atomizing and spraying means and a source of power for driving said pump means, of clutch mechanism automatically setting to make and releasable to break a driving connection between said source of power and said pump means, and clutch-control mechanism automatically operable to release said clutch and restrain the same from setting upon cessation of feed of fruit to said brush-roll mechanism but arranged to be actuated by the feeding movement of said fruit to free said clutch for its automatic setting.

9. In an apparatus for treating fruit, the combination with revoluble brush-rolls, means for feeding fruit thereto, a spray device operatively adjacent said brush rolls and arranged to discharge in operative proximity to the same, a container for molten paraffin or the like, means for heating said container, pump means for delivering the molten paraffin from said container to said spray device and a source of power therefor, of a clutch for making a driving connection between said source of power and said pump and clutch-control means comprising a control lever extending into the path of feed of the fruit and movable by the passing fruit to effect said driving connection, said lever being automatically movable in the absence of passing fruit to disconnect said clutch.

HAROLD C. PIERCE.